No. 713,385. Patented Nov. 11, 1902.
G. G. BEITZEL.
MOTION TRANSMITTING DEVICE.
(Application filed Dec. 18, 1901.)
(No Model.)
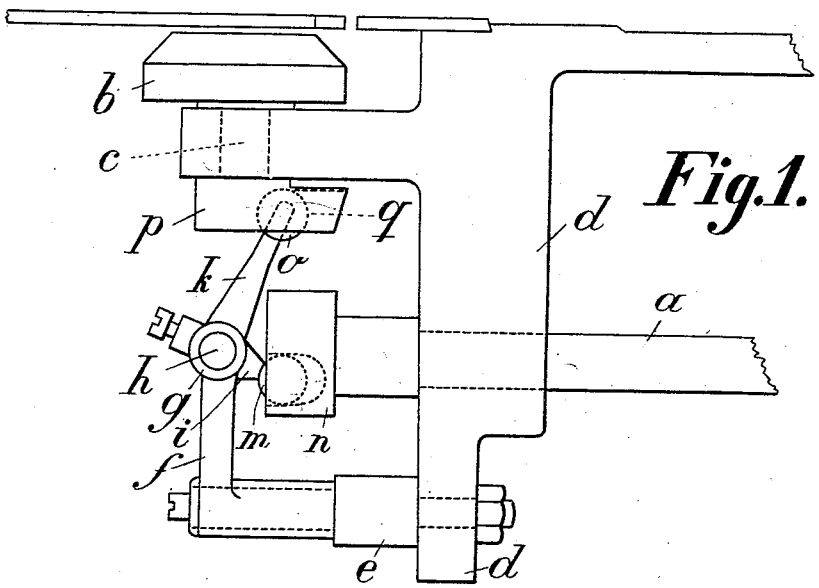
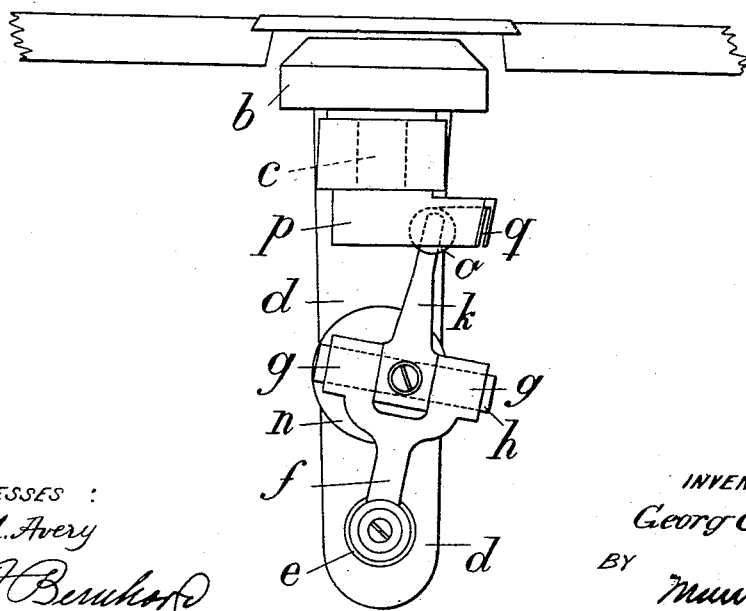
WITNESSES:
W. M. Avery
H. J. Bernhard
INVENTOR
Georg G. Beitzel
BY
ATTORNEYS

UNITED STATES PATENT OFFICE.

GEORG GOTTWALD BEITZEL, OF COPENHAGEN, DENMARK.

MOTION-TRANSMITTING DEVICE.

SPECIFICATION forming part of Letters Patent No. 713,385, dated November 11, 1902.

Application filed December 18, 1901. Serial No. 86,383. (No model.)

*To all whom it may concern:*

Be it known that I, GEORG GOTTWALD BEITZEL, of Copenhagen, Denmark, have invented certain new and useful Improvements in Motion-Transmitting Devices Specially Adaptable for Sewing-Machines, of which the following is a specification.

In sewing-machines with rotating shuttles it is very advantageous to impart to the shuttle-shaft a variable rotating motion in order that the upper thread may have sufficient time to be drawn away from the catcher or the shuttle before the new stitch is made. When the catcher is mounted upon the end of a vertical spindle which is driven from the main shaft of the machine, which shaft is generally arranged horizontally, the above-mentioned variable rotating motion of the catcher may be effected by means of specially-shaped cog-wheels. By such an arrangement, however, the various parts of the mechanism will be subjected to a considerable wear, and, moreover, the arrangement can only be made with difficulty to secure noiseless working of the machine. These difficulties have all been overcome by the device for transmitting the motion, forming the subject of the present invention, and in which the cog-wheels are replaced by a peculiar form of angle-lever capable of turning around two axles at right angles to each other, the one arm of said lever being connected with the driving-shaft, while the other arm is connected with the catcher.

In the accompanying drawings, Figures 1 and 2 show one constructional form of the device, seen in side and front elevation, respectively, the angle-lever of Fig. 2 being in different position from Fig. 1.

$a$ is the driving-shaft; $b$, the catcher, mounted upon the end of the spindle $c$, which is at right angles with the shaft $a$. This latter shaft $a$ as well as the spindle $c$ are turnably mounted in bearings arranged in a bracket $d$, forming part of the machine-frame. Below the shaft $a$ the bracket $d$ carries a bolt $e$, on which a fork $f$ is turnably arranged, said bolt $e$ constituting the axis of oscillation of the support or fork $f$. The two arms $g$ of the fork $f$ are provided with bearings for a rocking spindle $h$, carrying between the arms of the fork the angle-lever $i\,k$. The one arm $i$ of the angle-lever terminates in a ball $m$, capable of moving into a corresponding groove in a disk $n$, fixed on the end of the shaft $a$. The arm $k$ terminates in a ball $o$, moving into a corresponding groove in a disk $p$ on the end of the spindle $c$. When the shaft $a$ and the disk $n$ are turned, the angle-lever $i\,k$ will oscillate as the fork $f$ turns on the bolt $e$, and at the same time the angle-lever will turn with the spindle $h$. The ball $o$ will therefore travel in a curved path, and, moving freely in the groove of the disk $p$, it will impart a rotating motion to this disk and to the catcher $b$. It will be seen that this motion will not be an even one and that the catcher will rotate with the greatest speed when the ball $m$ is nearest to the bolt $e$, while the speed will be slowest when the ball $m$ is farthest away from the bolt $e$.

When the spindle $c$, as shown in Fig. 1, is not placed in the same plane as the fork $f$, the speed of rotation of the catcher may be still more varied; but the ball $o$ must then be able to move slightly forward and backward in a radial groove $q$ in the disk $p$.

Having now particularly described and ascertained the nature of the said invention and in what manner the same is to be performed, I declare that what I claim is—

1. In a motion-transmitting device, the combination with a driving part and a driven part standing at right angles to each other, of a spindle, a rocking support mounted to turn freely on said spindle back and forth in one plane of motion, an angular lever having its end portions connected operatively with said driving and driven parts respectively, and another spindle mounted in the support and having the lever fitted thereon, said lever being mounted in the support to turn in a direction at right angles to the plane of movement of the support.

2. In a motion-transmitting device, the combination with a driving part and a driven part standing at right angles to each other, of a fixed spindle, a forked support mounted on said spindle to oscillate freely back and forth in one plane of motion, a spindle mounted in said support at right angles to the fixed spindle, and a double-armed lever mounted on the spindle in said support and capable of an independent oscillation in a path at right angles to the plane of movement at said support, the arms of said lever being operatively connected with the driving and driven parts respectively.

3. In a motion-transmitting device, the combination of a socketed driving-disk, a socketed driven disk whose axis is at right angles to that of the driving-disk, a fixed spindle, a forked bracket mounted in said fixed spindle adjacent to the driving-disk and adapted to oscillate on an axis parallel to that of said disk, another spindle mounted on the forked arm and arranged at right angles to the fixed spindle, and a double-armed lever supported by said spindle in the bracket and turnable on an axis at right angles to that of the support, the arms of said lever being provided with heads which are loosely fitted in the sockets of the driving and driven parts.

4. In a motion-transmitting device, the combination of a driving-disk, a driven disk having a radial slot and standing at right angles to the driving-disk, a spindle, a rocking support mounted on the spindle to turn freely back and forth in one plane of motion, another spindle mounted in the support, and an angular lever provided with headed ends and mounted on the spindle carried by the support to turn in a direction at right angles to the plane of movement of the support, one headed end of the lever being connected loosely to the driving-disk and the head at the other end of the lever fitting in the slot of the driven disk to have free slidable travel therein radially to the disk.

In testimony that I claim the foregoing as my invention I have signed my name in presence of two subscribing witnesses.

GEORG GOTTWALD BEITZEL.

Witnesses:
 I. HOFMAN BANZ,
 J. C. JACOBSEN.